(12) United States Patent
Gomez et al.

(10) Patent No.: US 12,024,079 B2
(45) Date of Patent: Jul. 2, 2024

(54) SEAT AND SEAT MOUNTING STRUCTURE

(71) Applicant: Adient US LLC, Plymouth, MI (US)

(72) Inventors: John J. Gomez, Howell, MI (US); Kurt A. Seibold, Farmington Hills, MI (US); James D. Biebel, Milford, MI (US); Raza Bashir, Sterling Heights, MI (US); Dalibor Dimovski, Macomb, MI (US); Raymond Anthony Iavasile, Beverly Hills, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/654,825

(22) Filed: Mar. 15, 2022

(65) Prior Publication Data

US 2022/0194280 A1    Jun. 23, 2022

Related U.S. Application Data

(63) Continuation-in-part of application No. 16/734,711, filed on Jan. 6, 2020, now Pat. No. 11,305,673.

(60) Provisional application No. 62/788,996, filed on Jan. 7, 2019.

(51) Int. Cl.
*B60N 2/829* (2018.01)
*B60R 22/20* (2006.01)
*B60N 2/68* (2006.01)

(52) U.S. Cl.
CPC .............. *B60N 2/829* (2018.02); *B60R 22/20* (2013.01); *B60N 2/688* (2013.01)

(58) Field of Classification Search
CPC .. A61G 5/1067; A61G 5/1059; A61G 5/1075; A47C 1/12; A47C 1/022; A47C 7/5068; B60R 2022/1818
USPC ............................................. 297/344.16, 410
See application file for complete search history.

(56) References Cited

U.S. PATENT DOCUMENTS

| | | | |
|---|---|---|---|
| 5,320,412 A | 6/1994 | Eakins et al. | |
| 5,390,982 A * | 2/1995 | Johnson ................ | B60N 2/829 297/483 |
| 5,546,357 A | 8/1996 | Zehner | |
| 5,556,157 A | 9/1996 | Wempe | |
| 5,658,048 A * | 8/1997 | Nemoto ................ | B60R 22/20 297/410 |
| 5,868,461 A | 2/1999 | Brotherston | |
| 5,988,759 A * | 11/1999 | Bauer ................... | B60R 22/26 297/483 |
| 6,158,810 A | 12/2000 | Galloway | |
| 10,308,213 B2 * | 6/2019 | Faruque ................ | B60N 2/809 |
| 10,875,433 B2 * | 12/2020 | Hammadi ............. | B60N 2/829 |
| 11,167,663 B2 * | 11/2021 | Navatte ................ | B60N 2/0232 |
| 2005/0088024 A1 | 4/2005 | Rozaieski et al. | |

* cited by examiner

*Primary Examiner* — Sarah B McPartlin
(74) *Attorney, Agent, or Firm* — Marshall & Melhorn, LLC

(57) ABSTRACT

A headrest adjusting device for headrest adjustment with respect to a backrest may have a headrest mounting bracket and a slide device movable mounted on the headrest mounting bracket. The headrest mounting bracket may have a seat belt retainer movable mounted on the headrest mounting bracket. A seat structure for a vehicle seat may also have the headrest adjusting device.

17 Claims, 11 Drawing Sheets

SEAT AND SEAT MOUNTING STRUCTURE

BACKGROUND OF THE DISCLOSURE

The present disclosure relates generally to an adjustable seat. Further, the present disclosure relates generally to a seat mounting structure comprising such an adjustable seat.

In the state of the art, adjustable vehicle seats are known. A vehicle seat usually is adjustable to adapt the position and/or ergonomic configuration of the seat to the needs of an occupant of the seat. In many cases, the seats are mounted to the vehicle floor via seat adjusting devices, such as a seat track devices or a seat lifting devices.

SUMMARY OF THE DISCLOSURE

It is an object of the present disclosure to provide an improved adjustable seat for a vehicle. For instance, the present disclosure relates to an improved adjustable seat for an autonomous driving vehicle in order to enhance occupant comfort and comfort while adjustment of the seat. Moreover, the present disclosure relates to an improved seat mounting structure for a vehicle for simple serviceability of a seat of a vehicle, e.g. an autonomous driving vehicle.

According to the disclosure, the object of the seat is solved by the features claimed in the claims. Further, according to the disclosure the object of the seat mounting structure is solved by the features claimed in the claims.

According to the disclosure, a seat for a vehicle comprises at least a seat structure having at least a backrest frame part adjustable between an initial position and at least an inclined position, and a seat adjusting device having at least a number of linear actuators, wherein the number of linear actuators is at least mounted to the backrest frame part via a respective single pivot connection. Further, the seat adjusting device comprises a coupling mechanism providing an external pivot axis arranged behind the backrest frame part and which is relatively coupled with at least one linear actuator and the backrest frame part, wherein actuation of the at least one actuator initiates movement of the backrest frame part with respect to the external pivot axis. In particular, the external pivot axis defines one pivot constrained seat structure and kinematic.

Advantages of the present disclosure are providing a substantially lightweight and simple seat design for a vehicle. The seat adjusting device is configured substantially small-sized, e.g. due to usage of linear actuators while operating the linear actuators is energy efficient. The seat has efficient packaging properties and comprises easily serviceable components, e.g. an external seat adjusting device and drive units. For instance, the coupling mechanism is arranged behind the backrest frame part such that a space underneath the seat structure, such as underneath a seat pan frame part, is freed to be used for different seat or occupant service features. The seat adjusting device is located underneath the seat structure. In particular, the number of linear actuators is located underneath the seat structure, particularly underneath a seat pan frame part. For maintenance or exchange of the seat components, the seat and so the seat adjusting device may be disassembled from the vehicle in a simple manner. Further, with a small-sized adjusting device more packaging space for other vehicle units or passenger items or service items, e.g. storage bins or beverage and snack bars, is provided. For example, the seat may be provided in fleet service providers and autonomous driving vehicles or common driving vehicles.

According to an embodiment, actuation of the at least one linear actuator initiates movement of the backrest frame part about the external pivot axis. For example, an inclination of the backrest frame part is initiated by operating the linear actuator. The external pivot axis is an axis parallel to a horizontal axis, e.g. depending on an orientation of the seat structure the horizontal axis may align in a transverse direction of the vehicle. For example, the seat structure is adjustable between different inclined positions such as an inclined ingress and egress position, an inclined comfort position and a deep inclined relax position.

According to a further embodiment, actuation of the at least one linear actuator initiates substantially vertical movement of the backrest frame part with respect to the external pivot axis. For example, the backrest frame part is moved in a vertical direction with respect to a vehicle floor or ceiling for height adjustment of the seat structure.

In an embodiment, the seat structure comprises at least one seat pan frame part adjustable between an initial position and at least an inclined position, wherein a number of linear actuators is mounted to the seat pan frame part via a respective single pivot connection.

In another embodiment, the seat adjusting device comprises at least two linear actuators coupled to each lateral side of the seat pan frame part.

According to an aspect, a seat for a vehicle comprises a seat structure having at least a backrest frame part and a seat pan frame part both being adjustable between an initial position and at least an inclined position, and a seat adjusting device having at least a number of linear actuators. A first number of linear actuators is mounted to the backrest frame part via a respective single pivot connection, and a second number of linear actuators is mounted to the seat pan frame part via a respective single pivot connection, wherein the seat adjusting device comprises a coupling mechanism providing an external pivot axis arranged behind the backrest frame part and which is relatively coupled with the second number of linear actuators and the backrest frame part. Moreover, each linear actuator is individually or combined actuatable whereas depending on an individual actuation or a combined actuation the seat structure is relatively movable with respect to the external pivot axis in at least one degree of freedom up to a plurality of degrees of freedom. For example, the seat structure may be moved, e.g. inclined, tilted, pivoted, rotated, about a horizontal axis extending in a longitudinal direction of the seat. The seat structure may be moved about a horizontal axis extending in a transverse direction of the vehicle. Further, the seat structure may be moved, driven, raised and lowered, along a vertical axis extending in a vertical direction of the vehicle. Furthermore, a combined movement at least of about a roll and pitch axis and in a vertical direction is possible.

According to an embodiment, the coupling mechanism comprises a fixed coupling bar and two coupling elements each pivotable coupled to one side of the coupling bar. For instance, the coupling mechanism is substantially U-shaped or C-shaped. Each coupling element is coupled to the coupling bar. In an assembly step, the coupling mechanism is connected to the backrest frame part and in a further assembly step the coupling mechanism is connected to a seat mounting structure. That means that the coupling mechanism is fixed to the seat mounting structure with respect to a vertical and transverse position on the seat mounting structure, whereas the pivot bearings, e.g. bolts or pins or the like or any other pivotable fixation element, allow movement, e.g. rotation, tilting, pivoting, and swiveling about the external pivot axis. Particularly, the coupling mechanism is attached to the seat mounting structure, in particular to a seat rib cage, via the respective coupling element. The coupling element is configured as a cam element.

In a further embodiment, each coupling element is respectively coupled to the backrest frame part. At least one of the coupling elements connects the respective linear actuator via a pivot bearing to the backrest frame part. Further, each linear actuator which is coupling the seat pan frame part is coupled to said frame part via a pivot bearing.

For example, the coupling elements are configured to dependently couple each of the backrest frame part, the linear actuator and the coupling mechanism with respect to the external pivot axis. In particular, the coupling elements provide simple connecting, particularly linking, of different components with respect to each other for carrying out comfort adjustments of at least the backrest frame part in a simple and energy efficient manner. A pushing or pulling force of an actuated linear actuator causes the respective coupling element to move about and/or along the coupling rod, in particular the external pivot axis, whereas the backrest frame part is being moved.

In another embodiment, each coupling element comprises at least two connection areas, wherein one connection area is coupled to the backrest frame part and to the linear actuator and the other connection area is coupled to the coupling bar. For example, a distance between the pivot bearing of the backrest frame part and the pivot bearing of the linear actuator is less than a distance between the pivot bearing of the coupling element and the pivot bearing of the backrest frame part or of the linear actuator. For instance, the pivot bearings of each of the coupling element, the backrest frame part and the linear actuator are arranged substantially in a shape of a triangle with respect to each other.

According to an embodiment, actuation of the linear actuator initiates movement of the coupling element about the external pivot axis whereas the coupling element moves the backrest frame part in a guided manner with respect to the external pivot axis.

According to a further embodiment, the seat adjusting device comprises at least one bracket relatively coupled to the seat structure. For example, the seat adjusting device comprises two brackets each arranged on one lateral side of the seat structure. The brackets define a base structure to which the seat structure is relatively movable. In particular, the brackets are mountable or mounted to a vehicle floor, particularly to a vehicle floor structure. The brackets may be configured substantially small-sized since they only need to provide attachment points for the linear actuators. For example, each linear actuator is fixed to a corresponding bracket via a pivot bearing. The brackets may be formed identical or different from each other. The brackets are connected to each other via a connecting rod. The brackets are substantially triangular shaped. Further, the brackets comprise each a lower attachment point. At least one of the brackets comprise an upper attachment point. For example, linear actuators attached to each lateral side of the seat pan frame part are pivotable fixed on the lower attachment points, in particular via a respective pivot bearing. At least one linear actuator relatively coupled to the backrest frame part, in particular to the coupling mechanism, is fixed on the upper attachment point. For example, the linear actuator is fixed on the upper attachment point via a pivot bearing. Different shapes of the brackets are variable depending on a packaging space underneath the seat. Different arrangements of attachment points are variable depending on the shape of the brackets.

According to an embodiment, the seat pan frame part and the backrest frame part are configured as one-piece frame. The seat structure, in particular a frame structure, may comprise struts, beams, tubes, pipes, rods, bars, planes, pads. The seat structure may be supported by axially extendable struts, e.g. vertical or cross bearing struts or tubes and/or vertical or cross load struts or tubes, and/or coupled pivot mechanism. The seat structure may comprise a main frame for mounting a seat pan and/or a backrest. For example, the main frame is a one-piece part comprising a seat pan frame part and a backrest frame part. For example, the seat structure is a seat supporting frame made of at least one of metal or composite or hybrid material. The main frame may be formed by a plurality of frame elements, e.g. ribs, tubes, pipes and/or bearing beams, brackets, attachments, which are connected with each other, e.g. welded, bolted or screwed. The plurality of structures, e.g. struts, ribs, tubes, pipes, attachments of support elements, brackets, can be formed of composite or hybrid materials e.g. melded as a whole single part or unit or can be configured as separated elements or components bonded together to form a complete main frame.

According to a further embodiment, wherein when at least one linear actuator is in a non-actuated state, a pivot point is provided by said linear actuator whereas actuation of at least another linear actuator initiates movement of the seat structure about said pivot point. For example, the seat structure swivels about a pivot axis defined through the pivot point. For instance, the pivot bearing defines a pivot axis.

According to another embodiment, the seat adjusting device comprises at least one linear actuator configured being telescopic between at least a first length and a second length, and lockable in any state in which said linear actuator has the first length, the second length or any other length between the first length and the second length. For example, at least one linear actuator is configured as a hydraulic, a pneumatic, a spindle driven, electrical and power-driven actuator, e.g. a cylinder device. At least one linear actuator may comprise an adjustable manual locking mechanism or a hydraulic damper or a gas damper or a magnet-based damper. Moreover, at least one linear actuator may be spring-loaded to allow balancing adjustment motions. For instance, the linear actuators are linear drivable or driving adjusters. Particularly, the seat adjusting device is configured to carry out smooth movements for increased occupant comfort feeling.

According to an aspect, a seat mounting structure for a vehicle comprises at least a seat rib cage which comprises integrated seat mounting points, vehicle structure mounting points and mounting locations for seat adjusting devices, and a seat having a seat structure with at least a backrest frame part adjustable between an initial position and at least an inclined position. Further, the seat comprises a seat adjusting device having at least a number of linear actuators, wherein the number of linear actuators is at least mounted to the backrest frame part via a respective single pivot connection, wherein the seat adjusting device comprises a coupling mechanism providing an external pivot axis arranged behind the backrest frame part and which is relatively coupled with at least one linear actuator and the backrest frame part. Moreover, the coupling mechanism is coupled to the mounting location of the seat rib cage, wherein actuation of the at least one actuator initiates movement of the backrest frame part with respect to the external pivot axis.

According to an aspect, an adjustable vehicle seat comprises a one-piece seat structure, wherein a seat pan frame part and a backrest frame part are configured as an integral part. Further, the adjustable vehicle seat comprises a base structure to which the seat structure is mounted and a seat adjusting device arranged between the seat structure and the base structure, wherein the seat adjusting device comprises at least two linear drivable adjusters attached to the base structure and to the seat structure, wherein one of the linear drivable adjusters is connected to the base structure via a single pivot connection. The single pivot connection defines the external pivot axis. For instance, the linear drivable adjusters are lift adjusters. An efficient packaging can be achieved by said adjustable vehicle seat. Said seat adjusting device allows a 6-way powered movement providing comfort for all sized occupants as the seat travels vertically about 100 mm and pivots about a constrained mounting point, such as an external pivot point, about 30°. For example, the seat structure is pivotable mounted to a bulkhead structure of the vehicle. In particular, a movement of the seat structure is constrained and supported by the bulkhead. The seat adjusting device is configured to adjust the seat structure between tilted forward, substantially upright positions and reclined comfort positions including ingress and egress seat positions. The linear drivable adjusters actuate movement of the seat in an efficient and well-feeling motion. The seat structure is lightweight through use of composites and simplification of seat structural parts.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
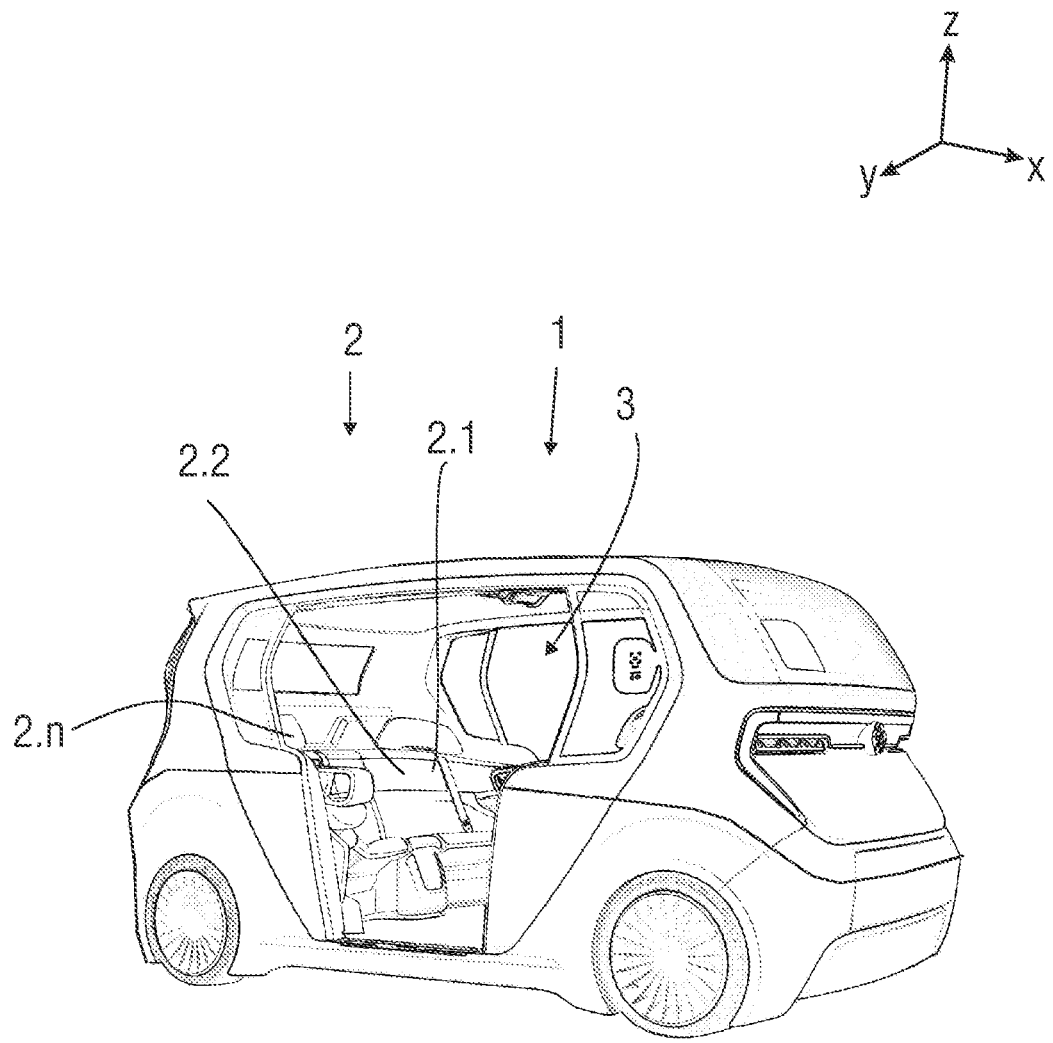
FIG. 1 shows a perspective view of a vehicle comprising a seat arrangement having a plurality of seat assemblies.

FIG. 1 shows a perspective view of an exemplary embodiment of a vehicle 1 comprising a seat arrangement 2 having a plurality of seat assemblies 2.1 to 2.$n$ arranged in a row R1, e.g. a rear row R1. The vehicle 1 is e.g. an autonomous driving vehicle 1 configured to autonomously pick up and transport occupants. A vehicle interior 3 can be designed as a passenger compartment in more economy way, comfortable way or luxury way for the occupants or as a loading or storage compartment vehicle 1.

For a better understanding of subsequent descriptions a coordinate system is shown in the figures. The coordinate system comprises a longitudinal axis x, a transverse axis y and a vertical axis z in relation to the vehicle 1. In particular, the longitudinal axis x defines a longitudinal extending direction and length of the vehicle 1, the transverse axis y defines a transverse extension direction and width of the vehicle 1 and the vertical axis z defines a vertical extension direction and height of the vehicle 1.

Figure 2:
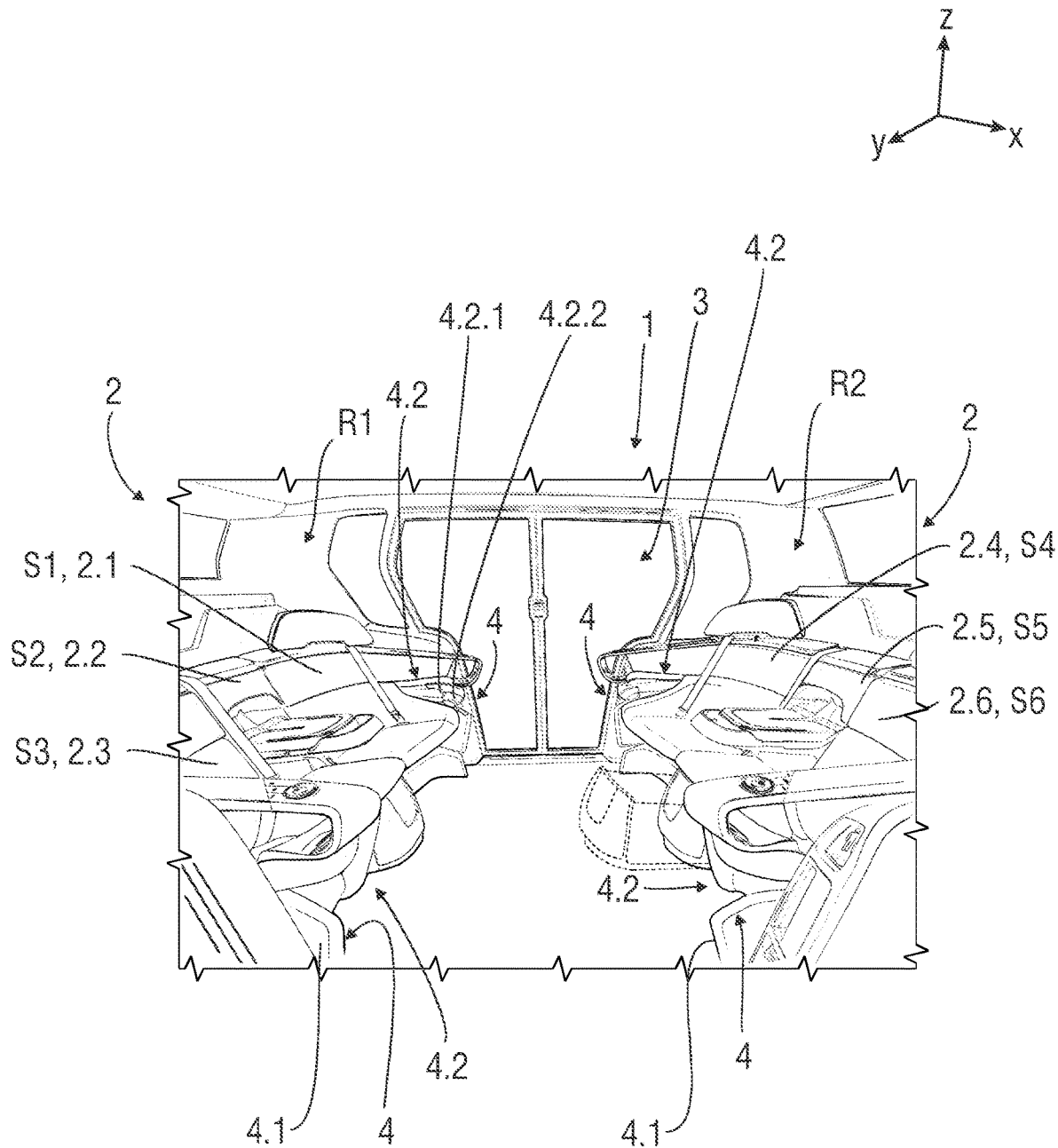
FIG. 2 shows a perspective view of a vehicle interior having at least two rows of a plurality of seat assemblies facing each other.

FIG. 2 shows a perspective view of a vehicle interior 3 having at least two rows R1, R2, e.g. a rear row and a front row, of a plurality of seat assemblies 2.1 to 2.6 of vehicle seats S1 to S6. Each of the rows R1 and R2 comprises three seat assemblies 2.1 to 2.3 and 2.4 to 2.6 wherein the seat assemblies 2.1 to 2.3 and 2.4 to 2.6 of the rows R1 and R2 are facing each other. Further shown in FIG. 2, the seat assemblies 2.1, 2.3, 2.4 and 2.6 are configured to form corner seat modules and the seat assemblies 2.2 and 2.5 are configured to form center seat modules. The corner seat modules may be identical, wherein particularly opposite corner seat modules are mirrored with respect to a respective transverse or longitudinal axis. At least the corner seats S1, S3, S4 and S6 are adjustable, e.g. adjustable in height and/or inclination. Moreover, a tray table device 4 is shown comprising a tray table element 4.1 and a table support structure 4.2 connected to the tray table element 4.1. The tray table element 4.1 is positioned in a vertical stowed position. The tray table element 4.1 is pivotable mounted with respect to the table support structure 4.2, wherein the table element 4.1 is pivotable to a horizontal use position. The table support structure 4.2 comprises a carrier structure 4.2.1 mounted in a region the corresponding corner seat S1, S3, S4 and S6 and a table support linkage 4.2.2, wherein the carrier structure 4.2.1 and the table support linkage 4.2.2 are connected to each other via a single pivot connection. The tray table element 4.1 is continuously movable about the single pivot connection between the vertical stowed position and the horizontal use position. The pivot connection is tilted at about 45°.

Figure 3:
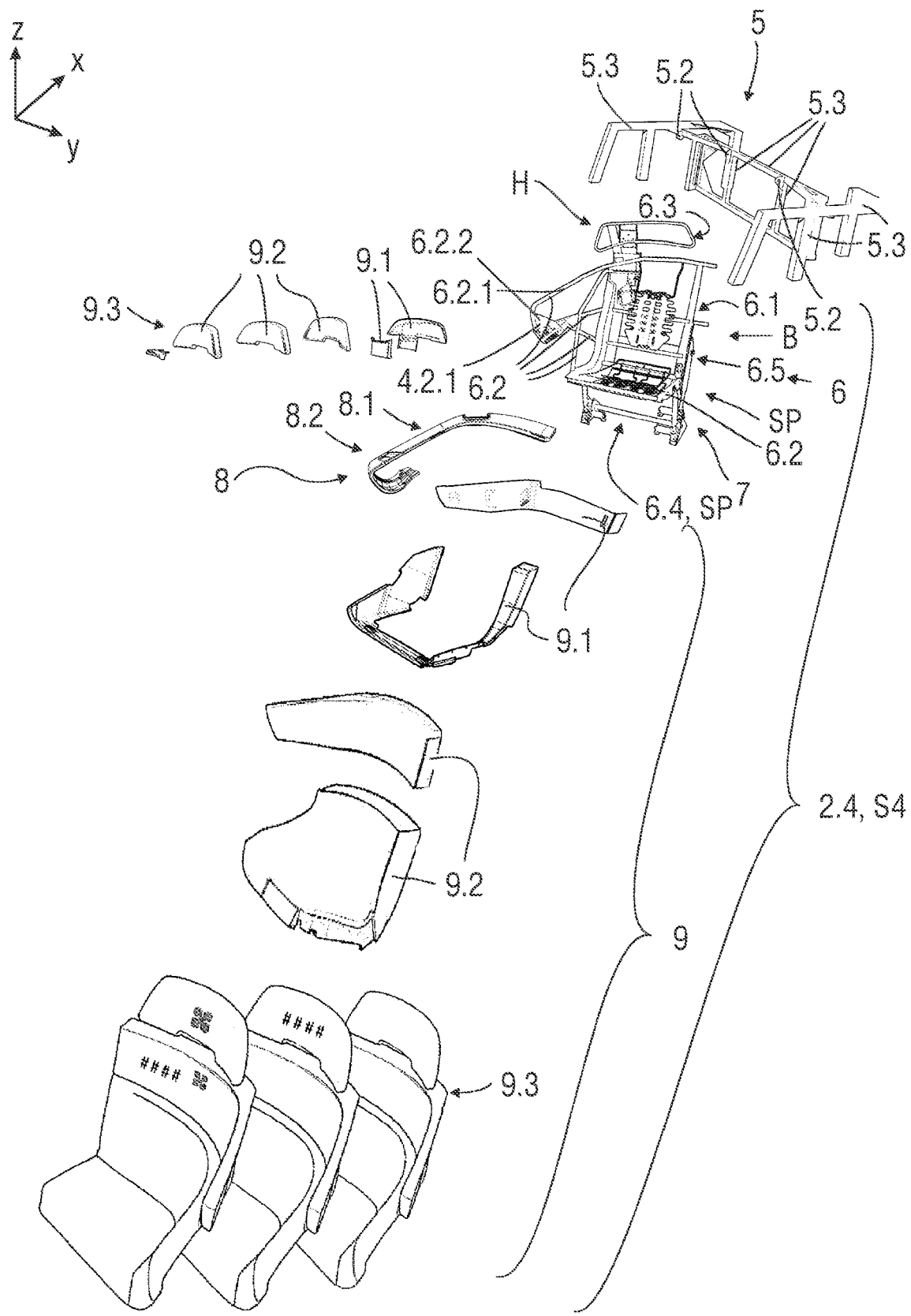
FIG. 3 shows an exploded view of an embodiment of a vehicle seat assembly comprising at least a seat mounting structure, a seat structure, an occupant support component and a seat trim structure.

FIG. 3 shows an exploded view of an embodiment of a vehicle seat assembly 2.1, 2.3, 2.4 or 2.6 comprising at least a seat mounting structure 5, a seat S1, S3, S4 or S6 having a seat structure 6 and a seat adjusting device 7. Further, an occupant support component 8 and a seat trim structure 9 may be arranged on the seat structure 6. Shown is e.g. the vehicle seat S4. The seat mounting structure 5 is fixed to a floor or a chassis of the vehicle 1. The seat mounting structure 5 comprises a seat rib cage 5.1 to attach and retain the seat structure 6 of the respective seat S4 on the floor or chassis. The seat rib cage 5.1 can be configured to retain one seat structure 6 of at least one respective seat S4 or more than one seat structure 6, e.g. a whole row R1 or R2. The seat mounting structure 5 comprises seat mounting points 5.2 to detachably mount the seat structure 6 to the seat mounting structure 5 e.g. by screws or rivets or the like. The seat rib cage 5.1 may be formed by a plurality of mounting elements 5.3, e.g. ribs, tubes, pipes and/or bearing beams, which are connected with each other, e.g. welded or screwed, adhered or the like. The seat structure 6 is configured e.g. as a main frame 6.1, e.g. a seat supporting frame made of at least one of metal or composite material. The main frame 6.1 may be formed by a plurality of frame elements 6.2, e.g. ribs, tubes, pipes and/or bearing beams, which are connected with each other, e.g. welded or screwed, adhered or the like. The seat structure 6 comprises at least one sub frame element 6.2.1 having a corresponding shape as the shape of the occupant support component 8 to retain it. The sub frame element 6.2.1 is configured to define a top surface of a backrest B. The sub frame element 6.2.1 may be substantially L-shaped. Further, the seat structure 6 comprises at least a second sub frame element 6.2.2 to retain the carrier structure 4.2.1 of the tray table device 4, e.g. also to retain a drive unit when adjustment of the table element 4.1 is power-driven. A headrest frame part 6.3 may be formed from a one-piece frame element. The seat adjusting device 7 is at least partially arranged underneath a seat pan frame part 6.4. Further, the seat structure 6 comprises a backrest frame part 6.5. In particular, the main frame 6.1 is divided in the seat pan frame part 6.4 and the backrest frame part 6.5. The adjusting device 7 may be fixedly mounted to the vehicle floor or chassis.

The occupant support component 8 comprises an L-shaped upper portion 8.1 and a U-shaped side portion 8.2. In particular, one of the legs of the U-shaped side portion 8.2 and one of the legs of the L-shaped upper portion 8.1 are configured as an integral, merged part. The L-shaped upper portion 8.1 is configured to be arranged on an upper surface of the backrest frame part 6.5 and the U-shaped side portion 8.2 is configured to be used as an armrest and which comprises a number of control devices, such as a touch display, buttons, input and output devices or other occupant controllable devices for operating adjustment of different seat features. The seat trim structure 9 is configured to be detachably attached to the main frame 6.1. The seat trim structure 9 comprises a mounting element 9.1 to which one or more foam support members 9.2 may be detachably arranged, wherein one or more trim elements 9.3 may be arranged onto one or more of the support members 9.2 and detachably attached to the mounting element 9.1. For example, the headrest frame part 6.3 is configured to retain a headrest H, such as a padded headrest support member 9.2. The seat pan frame part 6.4 is configured to retain a seat pan SP, such as a padded seat pan support member 9.2. The backrest frame part 6.5 is configured to retain a backrest B, such as a padded backrest support member 9.2.

Figure 4A:
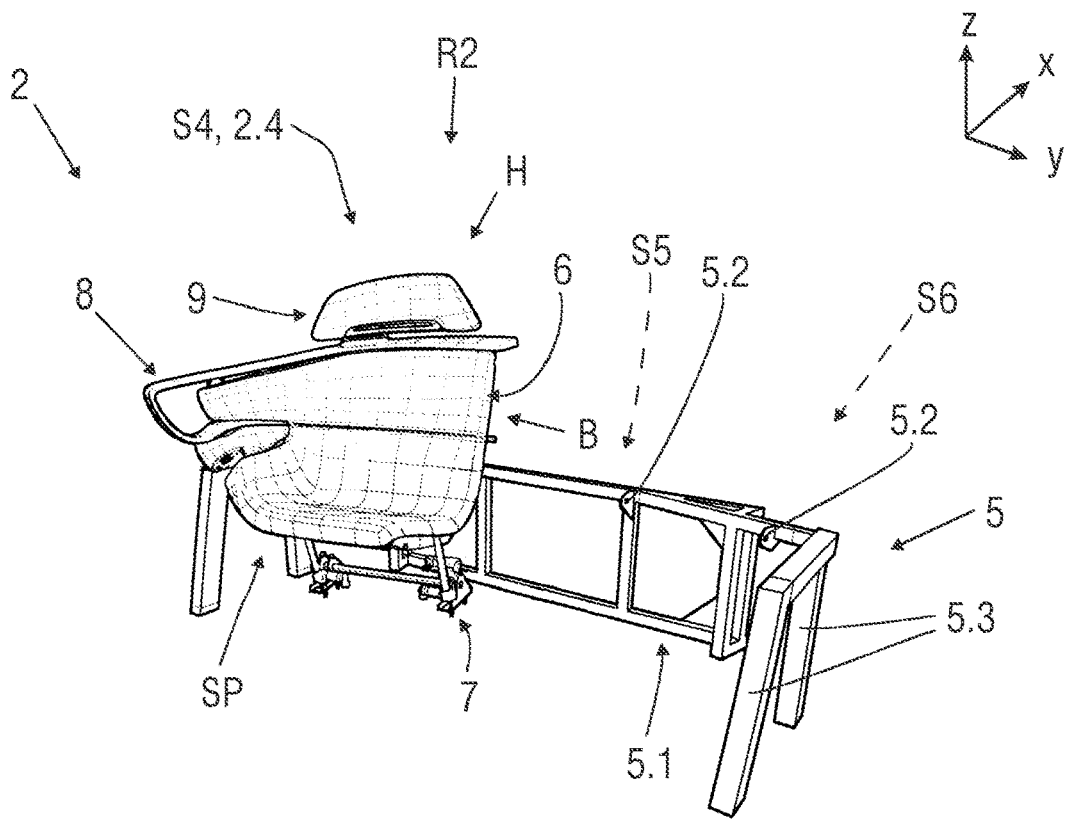
FIG. 4A shows a perspective view of an embodiment of a seat structure and a seat mounting structure in a mounted state.
Figure 4B:
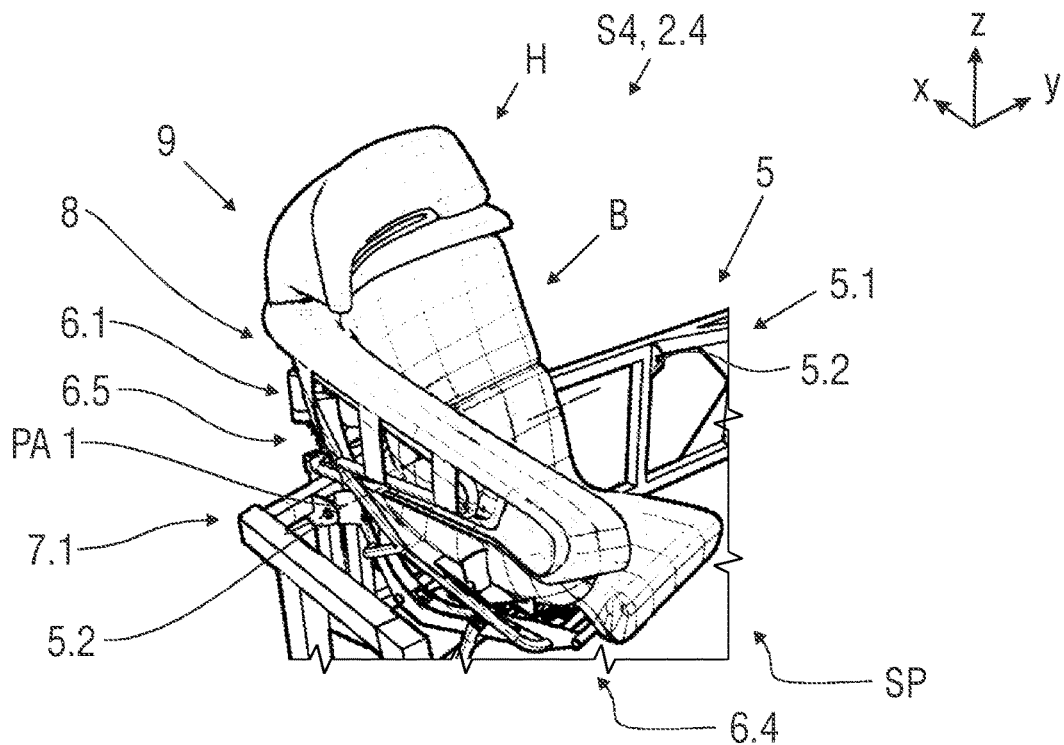
FIG. 4B shows a perspective view of an embodiment of a seat structure and a seat mounting structure in a mounted state.

FIGS. 4A and 4B show perspective views of an embodiment of a seat structure 6 and a seat mounting structure 5 in a mounted state. Exemplary shown is the main frame 6.1 of one single seat S4 fastened to the seat rib cage 5.1. The main frame 6.1 is fastened to the seat rib cage 5.1 by the seat mounting points 5.2 in such a manner that the seat structure 6 is relatively movable with respect to the seat rib cage 5.1 by the seat adjusting device 7, e.g. in vertical direction up U and down D or about a horizontal pivot axis fore F and aft A. Further seats S5, S6 may be fastened to the seat rib cage 5.1 by the free seat mounting points 5.2. The seats S4, S5, S6 are pre-assembled by mounting the seat adjusting device 7 to the seat structure 6 and afterwards by attaching a pre-assembled trim structure 9 to the seat structure 6. Thereafter, each of the seats S4, S5, S6 is mounted to the seat mounting structure 5. This provides quick assembly and disassembly properties. The seat rib cage 5.1 is configured as a universal mounting structure for one or more seat assemblies 2.4 to 2.6 to provide different visual appealing interior types. The seat mounting structure 5 is integrated into a vehicle structure, e.g. chassis or frame. The seat mounting structure 5 may form an integrated part of the vehicle structure. Alternatively the seat mounting structure 5 may be a separately attached unit. In particular, the seat mounting structure 5 may be an assembly unit which is e.g. welded to the vehicle structure. As further shown in FIG. 4B the seat structure 6 is only mounted to the seat rib cage 5.1 in its backrest B area. A fixation to a vehicle floor or chassis is provided by the adjusting device 7. In particular, the adjusting device 7 comprises a coupling mechanism 7.1 providing an external pivot axis PA1 arranged behind the backrest frame part 6.5. The backrest frame part 6.5 is pivotable about the external pivot axis PA1 in a substantially fore F and aft A direction. Further, the backrest frame part 6.5 is movable in the vertical direction up U and down D with respect to the external pivot axis PA1. The backrest frame part 6.5 is coupled to the seat pan frame part 6.4 such that moving the backrest frame part 6.5 leads to movement of the seat pan frame part 6.4. For example, the backrest frame part 6.5 and the seat pan frame part 6.4 are integrally formed as the main frame 6.1.

Figure 5A:
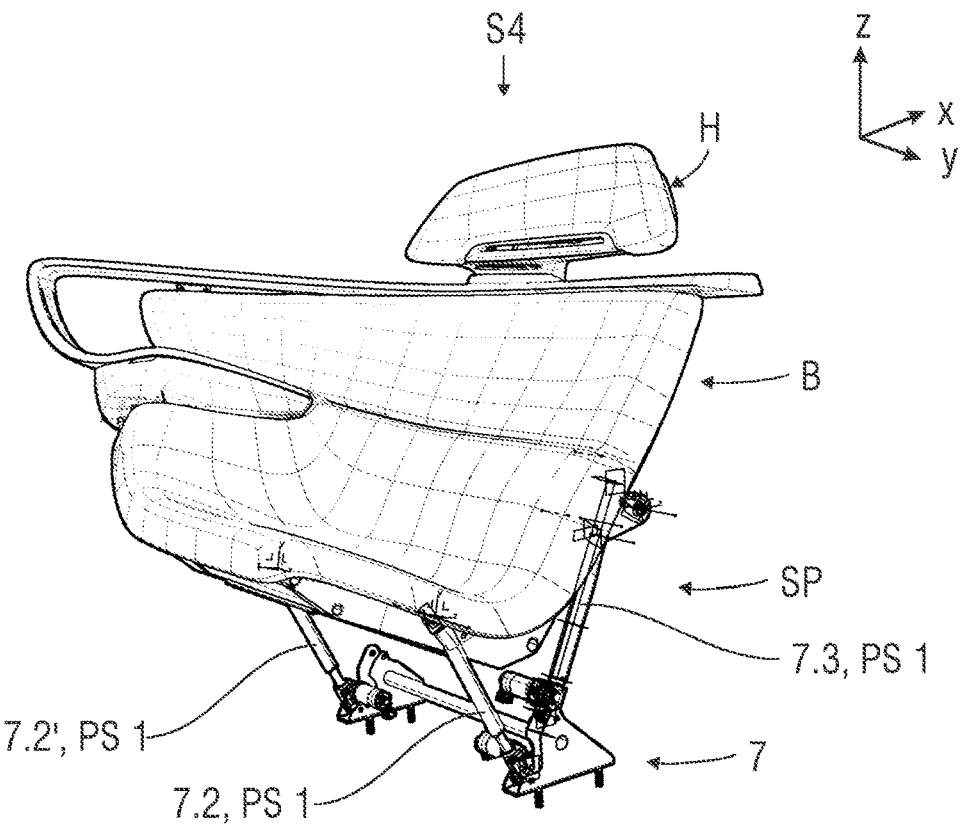
FIG. 5A shows a perspective view of an embodiment of a seat structure comprising an adjustment device.
Figure 5B:
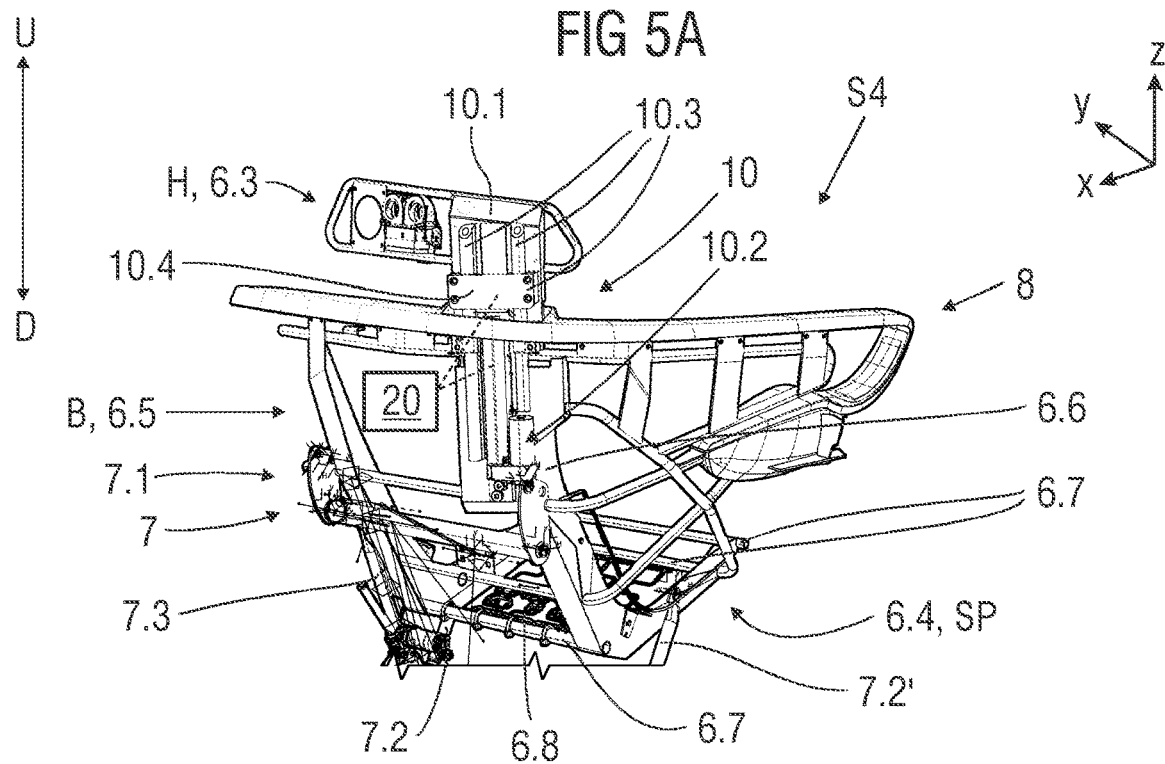
FIG. 5B shows a perspective view of an embodiment of a seat structure comprising an adjustment device.

FIGS. 5A to 5D each shows a perspective view of an embodiment of a seat structure 6 comprising a seat adjusting device 7. In particular, FIG. 5A shows the seat structure 6 from a perspective front view having support members 9.2 of the seat trim structure 9 arranged on it. FIG. 5B shows the seat structure 6 from a perspective rear view without the support members 9.2. The seat structure 6, in particular its main frame 6.1 is e.g. made of at least one of metal or composite material, in particular comparatively lightweight material. The seat structure 6 comprises the main frame 6.1 configured to mount different parts of a seat S4, e.g. a seat pan SP, a backrest B and a headrest H. For instance, the main frame 6.1 comprises a lower frame part for mounting a seat pan SP on it, a middle frame part for mounting a backrest B and an upper frame part for mounting a headrest H. The main frame 6.1 could be further simplified by combining at least the lower frame part and the middle frame part into a mono-frame or one-piece frame. The lower frame part refers to the termed seat pan frame part 6.4. The middle frame part refers to the termed backrest frame part 6.5. The upper frame part refers to the headrest frame part 6.3. The seat structure 6 has a plurality of tubes, in particular vertical bearing tubes 6.6 and/or cross holding tubes 6.7. In particular, two cross holding tubes 6.7 are arranged in the area of the seat pan frame part 6.4. The cross holding tubes 6.7 are being spaced from one another by an opening in which auxiliary units, e.g. a spring pad 6.8, is arranged and hold onto the cross holding tubes 8.7, e.g. by hooks. The cross holding tubes 6.7 may also be used to arrange and hold the mounting element 9.1 and/or the detachable support members 9.2 of the seat trim structure 9. Further shown in FIG. 5B is a headrest adjusting device 10 for headrest adjustment with respect to the backrest B. The headrest adjusting device 10 comprises a vertical headrest mounting bracket 10.1 which is guided through a recess provided in the occupant support component 8. The headrest mounting bracket 10.1 is fixed to the main frame 6.1, in particular in an area of the sub frame element 6.2.1. The headrest adjusting device 10 comprises a drive unit 10.2, e.g. a motor or other drivable actuator, and a slide device 10.3 movable mounted on the mounting bracket 10.1. On actuation of the drive unit 10.2, the slide device 10.3 is configured to move the headrest H up U and down D. Further, the mounting bracket 10.1 comprises a seat belt retainer 10.4 retaining a seat belt to the seat S4. In particular, the seat belt retainer 10.4 is configured as seat belt retractor. The seat belt retainer 10.4 is also movable in up U and down D direction to adapt to a headrest height in view of the backrest B. For example, a larger sized occupant may adjust the headrest height whereas adjustment of a seat belt retaining position, in particular an upper seat belt retaining position, may be also required for increased comfort feeling of the occupant. The seat belt retainer 10.4 is e.g. coupled to the slide device 10.3. Optionally or additionally, the seat belt retainer 10.4 is individually movable from the slide device 10.3. The occupant may adjust the seat belt retainer 10.4 as desired. The headrest H comprises ventilating features. For example, the headrest adjusting device 10 comprises at least one self-adjusting control device 20 to adjust the slide device 10.3 to correct height for each individual user sitting on the seat S1 to S6. For example, the self-adjusting control device 20 is coupled to the slide device 10.3. For example, the self-adjusting control device 20 is coupled to the seat belt retainer 10.4 to adjust the seat belt retainer 10.4 individually or together with the slide device 10.3 to correct height for each individual user sitting on the seat S1 to S6.

The self-adjusting control device 20 utilizing integral sensors arranged in the seat S1 to S6, for example in a headrest cushion, to generate a signal to control at least one of the slide device 10.3 or the seat belt retainer 10.4 to adjust its height. For example, the self-adjusting control device 20 utilizing captured information from vehicle cameras installed within the vehicle as input to adjust at least one of the slide device 10.3 or the seat belt retainer 10.4 to adjust its height. For example, a headrest cushion height and a seat belt retainer height can be adjusted automatically according to input signals. A body height, shoulder portions, neck portions and head portions can be measured and determined by means of the sensors or cameras. According to these measured and determined information, the self-adjusting control device 20 is activated to adjust the headrest H and the seat belt retainer 10.4.

Figure 5C:
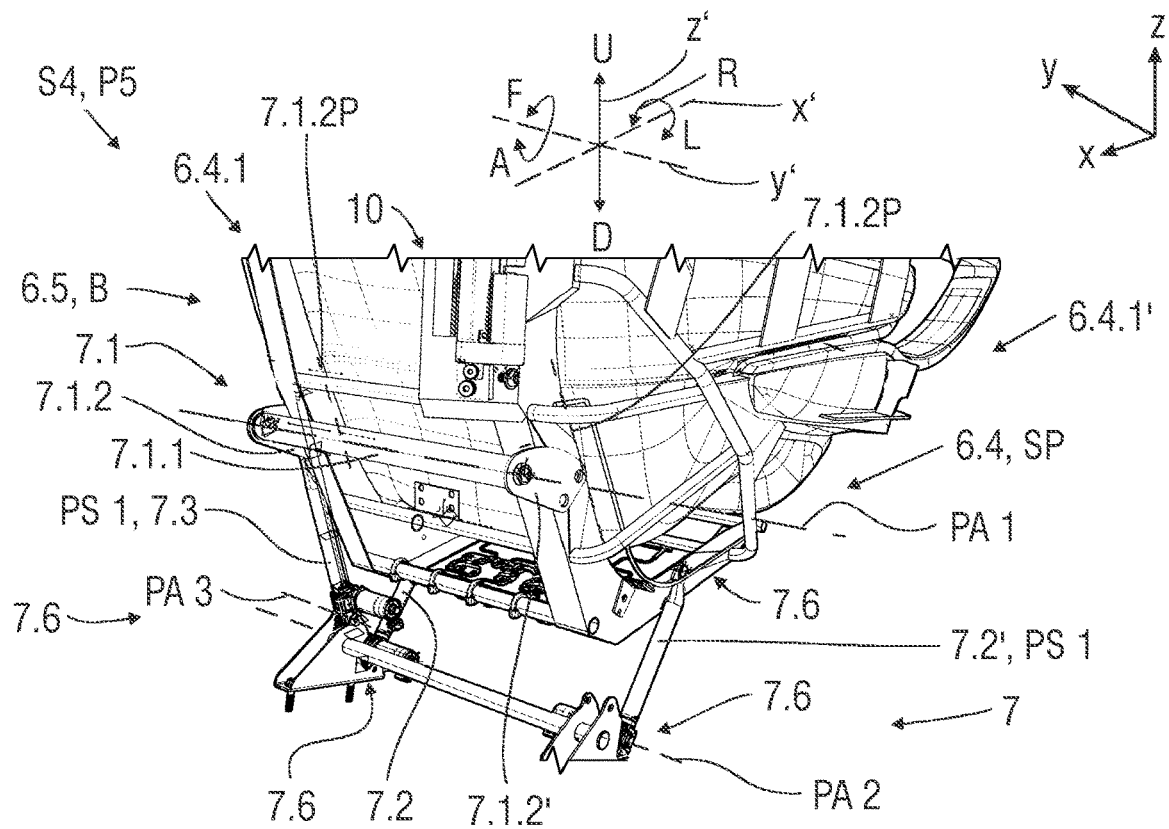
FIG. 5C shows a perspective view of an embodiment of a seat structure comprising an adjustment device.
Figure 5D:
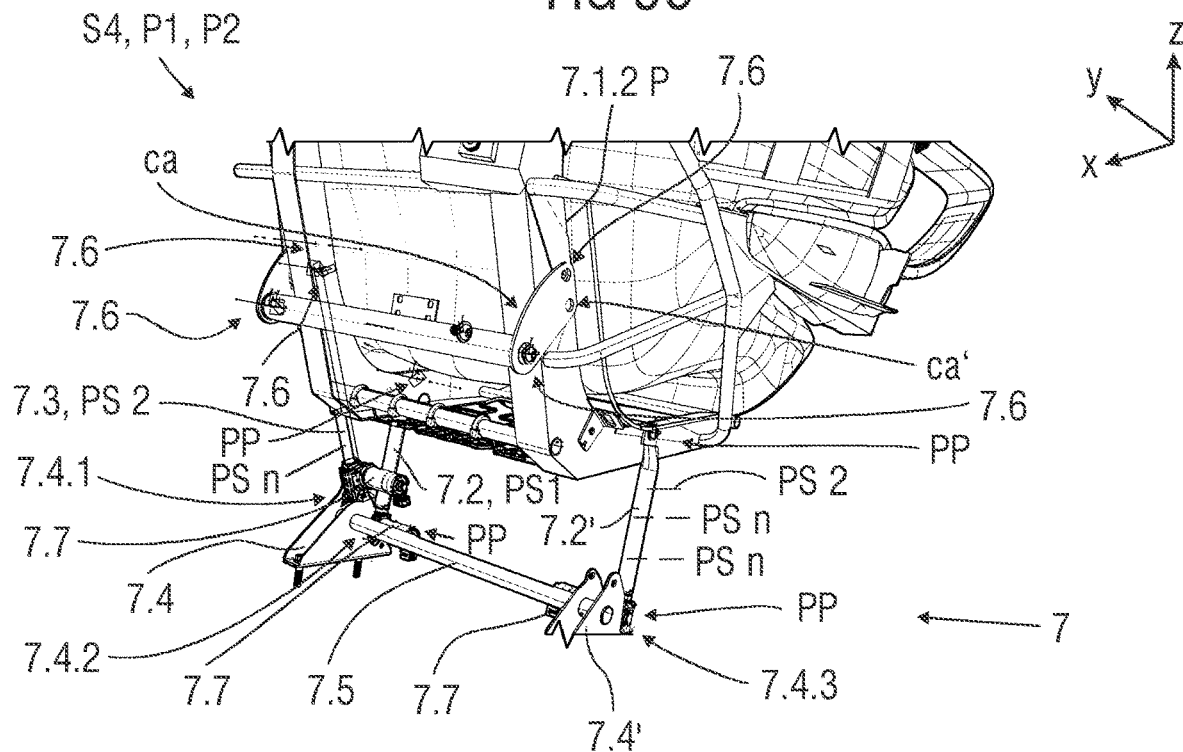
FIG. 5D shows a perspective view of an embodiment of a seat structure comprising an adjustment device.

As shown in FIGS. 5A, 5C and 5D the seat adjusting device 7 comprises the coupling mechanism 7.1 and a number of linear actuators 7.2 to 7.3. The linear actuators 7.2 to 7.3 are lift adjusters. In particular, the linear actuators 7.2 to 7.3 are configured being telescopic between at least a first length and a second length. That means that the linear actuators 7.2 to 7.3 are length adjustable between at least an initial state PS1 which refers to a first length, such as a non-extended length, and at least a second end state PS2 which refers to a second length, such as a fully-extended length in an end position. In particular, the linear actuators 7.2 to 7.3 are lockable in any state PS1, PS2, PSn. In particular, each linear actuator 7.2 is lockable in any length between the first length and the second length as exemplary shown in FIGS. 5C and 5D.

Further, the seat adjusting device 7 comprises two mounting brackets 7.4, 7.4' arranged opposite each other, e.g. seen in a transverse direction of the vehicle 1. Each bracket 7.4 and 7.4' is located underneath the seat pan frame part 6.4. In particular, each bracket 7.4, 7.4' is attached to a vehicle floor structure or chassis, e.g. via screws, bolts or the like. Each bracket 7.4, 7.4' is arranged on one lateral side 6.4.1, 6.4.1' of the seat pan frame part 6.4. Further, each bracket 7.4, 7.4' is arranged substantially in an area of a rear side 6.4.2 of the seat structure 6. In particular, the brackets 7.4, 7.4' are arranged substantially on side of the backrest B. Thereby, the seat structure 6 or seat S4 is substantially held in its center of gravity, in particular due to the fixation to the seat mounting structure 5 in an area behind the backrest B and in an area underneath the seat structure 6 with respect to the ground. The brackets 7.4, 7.4' are substantially triangular shaped though any shape is possible. The brackets 7.4 and 7.4' are connected to each other via a connecting rod 7.5 for pre-positioning and fixation of the brackets 7.4, 7.4' with respect to each other. One of the brackets 7.4, 7.4' comprises a number of attachment points 7.4.1 to 7.4.3.

The number of attachment points 7.4.1 to 7.4.3 depends on the number of to be mounted linear actuators 7.2 to 7.3. For example, as shown, the seat adjusting device 7 comprises one bracket 7.4 comprising two attachment points 7.4.1 and 7.4.2. The attachment point 7.4.1 defines an upper attachment area. The attachment point 7.4.2 defines a lower attachment area. On side of this bracket 7.4 the seat adjusting device 7 provides two linear actuators 7.2 and 7.3. On side of the opposite bracket 7.4' the adjusting device 7 provides one linear actuator 7.2'. In another embodiment, the adjusting device 7 can also provide two linear actuators 7.2' on side of the bracket 7.4'. For example, the linear actuators 7.2 and 7.2' are attached to each lateral side 6.4.1, 6.4.1' and are pivotable fixed to the lower attachment points 7.4.2, 7.4.3. Each linear actuator 7.2, 7.2' is movable fixed to the corresponding attachment point 7.4.2, 7.4.3, in particular via a respective pivot bearing 7.6 comprising a bolt or pin element. The at least one linear actuator 7.3 relatively coupled to the backrest frame part 6.5, in particular to the coupling mechanism 7.1, is fixed on the upper attachment point 7.4.1. For example, this linear actuator 7.3 is fixed on the upper attachment point 7.4.1 via a pivot bearing 7.6 comprising a bolt or pin element. The linear actuators 7.2 to 7.3 are relatively movable with respect to the brackets 7.4 and the seat structure 6. In particular, the linear actuators 7.2 to 7.3 are each pivotable about a pivot axis PA2, PA3 provided by the respective pivot bearing 7.6 to allow smooth swiveling motions of the seat structure 6 with respect to the fixed external pivot axis PA1. The pivot bearings 7.6 are for example simple fittings which are articulately joined to the seat structure 6.

The coupling mechanism 7.1 comprises a fixed coupling bar 7.1.1. Further, the coupling mechanism 7.1 comprises two coupling elements 7.1.2, 7.1.2' each pivotable coupled to one side of the coupling bar 7.1.1. The coupling elements 7.1.2, 7.1.2' are, for instance, configured as cam elements or any other movement transmitting plate or disc element. For instance, the coupling mechanism 7.1 is substantially U-shaped or C-shaped. The coupling mechanism 7.1 is configured as seat structure 6 holding mechanism. Furthermore, each coupling element 7.1.2, 7.1.2' comprises at least two connection areas ca, ca', wherein one connection area ca' is coupled to the backrest frame part 6.5 and to the corresponding linear actuator 7.3. The other connection area ca is coupled to the coupling bar 7.1.1. The coupling mechanism 7.1 is mounted to the seat mounting structure 5. In particular, the coupling mechanism 7.1 is mounted to the seat mounting points 5.3 provided by the seat mounting structure 5. Each coupling element 7.1.2, 7.1.2' is coupled to the coupling bar 7.1.1. The coupling bar 7.1.1 may be welded or adhered to the coupling elements 7.1.2, 7.1.2' and attached to the seat mounting structure 5 via the coupling elements 7.1.2, 7.1.2' and the respective pivot bearing 7.6. For example, the coupling bar 7.1.1 is configured to provide same movement of the coupling elements 7.1.2, 7.1.2' with respect to each other. In a further embodiment, independent movement from each other is provided when the coupling elements 7.1.2, 7.1.2' are not fixedly coupled to each other. That means each lateral side 6.4.1, 6.4.1' may move independently from each other in up U and down D direction or fore F and aft A direction, in particular with respect to the external pivot axis PA1. In particular, the coupling mechanism 7.1 provides the external pivot axis PA1 for seat adjustment. In an assembly step, the coupling mechanism 7.1 is connected to the backrest frame part 6.5 and in a further assembly step the coupling mechanism 7.1 and so as the seat structure 6 is connected to a seat mounting structure 5. That means that the coupling mechanism 7.1 is fixed to the seat mounting structure 5 with respect to a vertical and transverse position on the seat mounting structure 5, whereas the pivot bearings 7.6 allow movement, e.g. rotation, tilting, pivoting, of the seat structure 6, in particular in the area of the backrest B, about and/or along the external pivot axis PA1. Particularly, the coupling mechanism 7.1 is attached to the seat mounting structure 5, in particular to the seat rib cage 5.1, at the seat mounting points 5.2 via the respective coupling elements 7.1.2, 7.1.2'. Further, the coupling bar 7.1.1 is held in position at the seat mounting points 5.2 providing the fixed external pivot axis PA1 in an area behind the backrest B. Each coupling element 7.1.2, 7.1.2' is coupled to the backrest frame part 6.5 via a pivot bearing 7.6, e.g. a pin or bolt element. Further, each coupling element 7.1.2, 7.1.2' may be coupled to a respective linear actuator 7.3 via a pivot bearing 7.6, e.g. a pin or bolt element. Further, each linear actuator 7.2 and 7.2' which is attached to the seat pan frame part 6.4 is coupled to said frame part 6.4 via a pivot bearing 7.6, e.g. a pin or bolt element. In particular, the linear actuators 7.2, 7.2' are coupled with a center portion with respect to a longitudinal extension direction of the seat pan SP to distribute and support weight of the seat S4. For example, a pushing or pulling force of the respective linear actuator 7.2, 7.2' causes the seat pan frame part 6.4 to tilt, e.g. tip in a downward direction or in an upward direction. The linear actuators 7.2, 7.2' are dependently or independently actuatable and lockable with respect to each other. For example, the linear actuators 7.2 to 7.3 are each coupled to one drive unit 7.7. The coupling elements 7.1.2, 7.1.2' are e.g. provided to allow independent movement of each lateral side 6.4.1, 6.4.1' with respect to the external pivot axis PA1 when the coupling elements 7.1.2, 7.1.2' are not fixedly joined to each other. The coupling elements 7.1.2, 7.1.2' are movable about the external pivot axis PA1, in particular along a path 7.1.2P. For example, by driving the linear actuators 7.2, 7.2' the seat structure 6 is movable about a pitch swivel axis. The seat structure 6 is also height adjustable when the linear actuators 7.2 to 7.3 are driven in a combined manner.

A pushing or pulling force of an actuated rear linear actuator 7.3 causes at least the corresponding coupling element 7.1.2 to move about and/or along a path with respect to the external pivot axis PA1, e.g. along an axis parallel to any tangent of the external pivot axis PA1, whereas the backrest frame part 6.5 is being moved. The coupling elements 7.1.2 and 7.1.2' are joined to each other via the coupling rod 7.1.1, whereby movement of the one coupling element 7.1.2 is transmitted to the coupling bar 7.1.1 and so as to coupling element 7.1.2'. Since the seat structure 6 is a one-piece part, the seat pan frame part 6.4 is being moved together with the backrest frame part 6.5. In case the coupling elements 7.1.2, 7.1.2' are not joined in such a fixed manner, two linear actuators 7.3 may be provided by the adjusting device 7, wherein each of the linear actuators 7.3 is respectively coupled to one of the coupling elements 7.1.2, 7.1.2'. The linear actuators 7.3 may be independently movable with respect to each other so that the seat structure 6 may be moved about a roll swivel axis.

Moreover, when at least one of the linear actuators 7.2 to 7.3 is in a non-actuated state, a pivot point PP is provided by said linear actuator 7.2 to 7.3 in an area of the seat structure 6 whereas actuation of at least another linear actuator 7.2 to 7.3 initiates movement of the seat structure 6 about said pivot point PP with respect to the external mounting and pivot axis PA1. For example, the seat structure 6 swivels about a pivot axis defined through the pivot point PP. For instance, the respective pivot bearing 7.6 defines the pivot point PP and pivot axis. Furthermore, each linear actuator 7.2 to 7.3 may be individually or combined actuatable whereas depending on an individual actuation or a combined actuation the seat structure 6 is relatively movable with respect to the external pivot axis PA1 in at least one degree of freedom up to a plurality of degrees of freedom. For example, the seat structure 6 is movable in the up U and down D direction along a vertical axis z', the fore F and aft A direction about a transverse axis y' and in a right R and left L direction about a longitudinal axis x' in a single movement or a combined movement.

In particular, FIG. 5D shows the seat S4 in an initial position P1 such as a home position P1 or design position P1 or a vertical-up and slightly tipped forward position P2 such as a greeting, egress and ingress position P2 and FIG. 5C shows the seat S4 in a deep recline relax and comfort position P4.

FIGS. 6A to 6E show side views of an embodiment of a seat adjustment motion, in particular of the seat S4 in different positions P1 to P4.

Said seat adjusting device 7 allows a powered movement e.g. up to 6-ways providing comfort for all sized occupants as the seat S4 travels in a vertical direction between 0 to 150 mm, e.g. 50 to 120 mm, in particular 100 mm and pivots about a constrained mounting point MP provided by the coupling mechanism 7.1 between 0° to 50°, e.g. 10° to 40°, in particular 30°. For example, the seat structure 6 is pivotable mounted to the seat mounting structure 5 at the constrained mounting point MP which also provides the external pivot axis PA1. In particular, a movement of the seat structure 6 is constrained and supported by the seat mounting structure 5. The seat adjusting device 7 is configured to adjust the seat structure 6 between tilted forward positions such as position P2, substantially upright positions such as position P1, and reclined comfort positions such as positions P3 and P4. It is understood that the seat S4 may be positioned in any position at least between the shown positions P1 to P4.

Figure 6A:
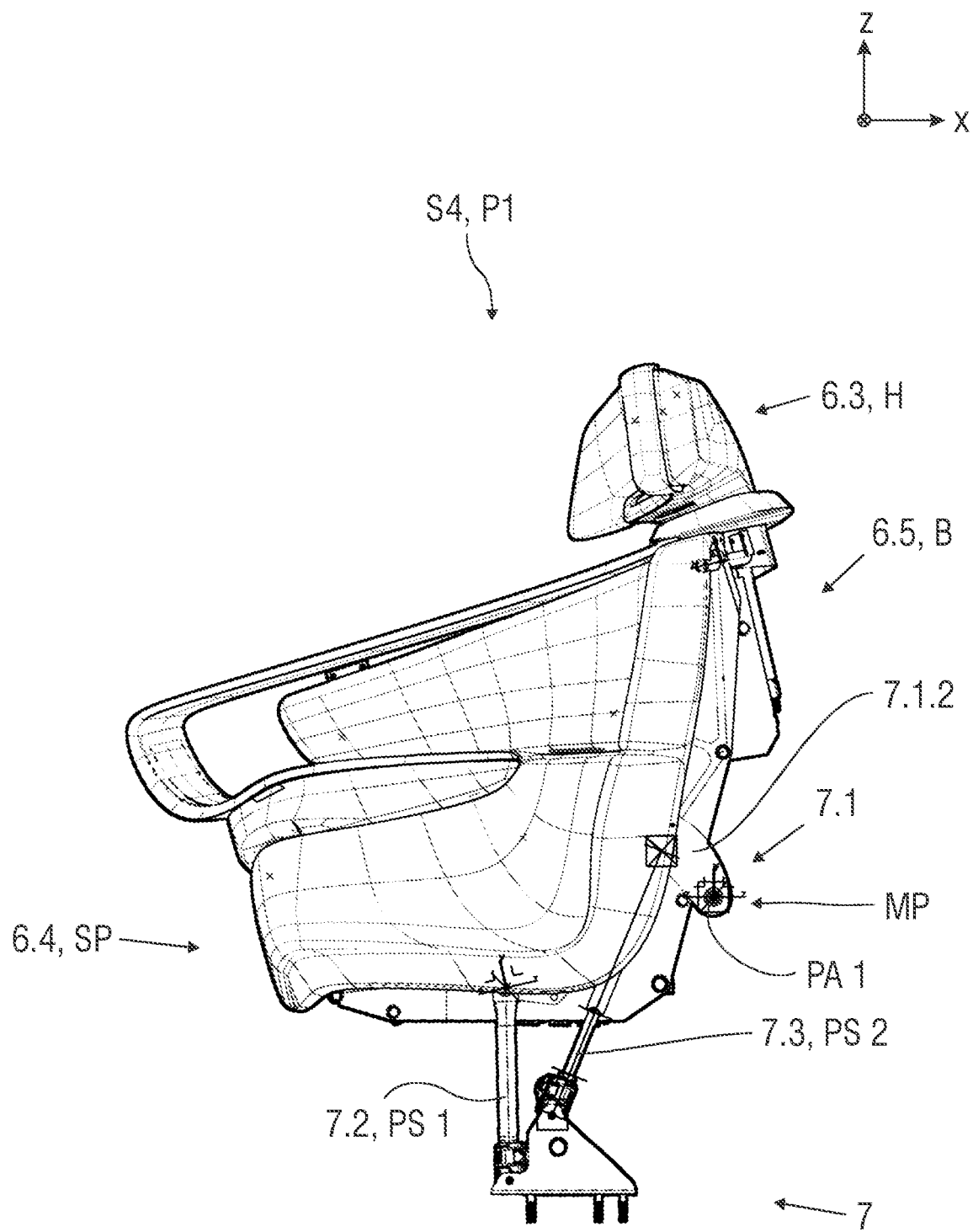
FIG. 6A shows a side view of an embodiment of a seat adjustment motion, in particular of the seat in one position.
Figure 6B:
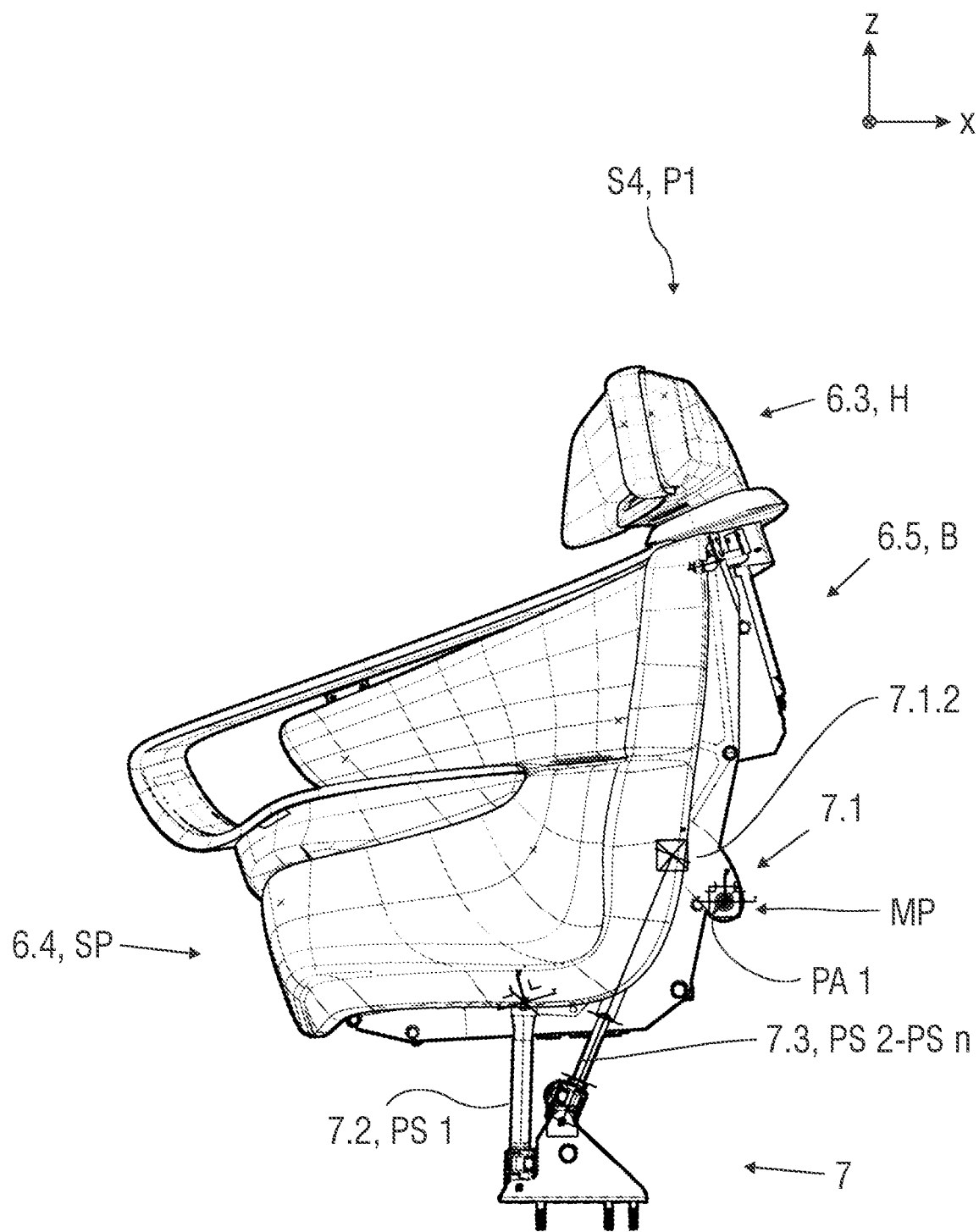
FIG. 6B shows a side view of an embodiment of a seat adjustment motion, in particular of the seat in a different position.
Figure 6C:
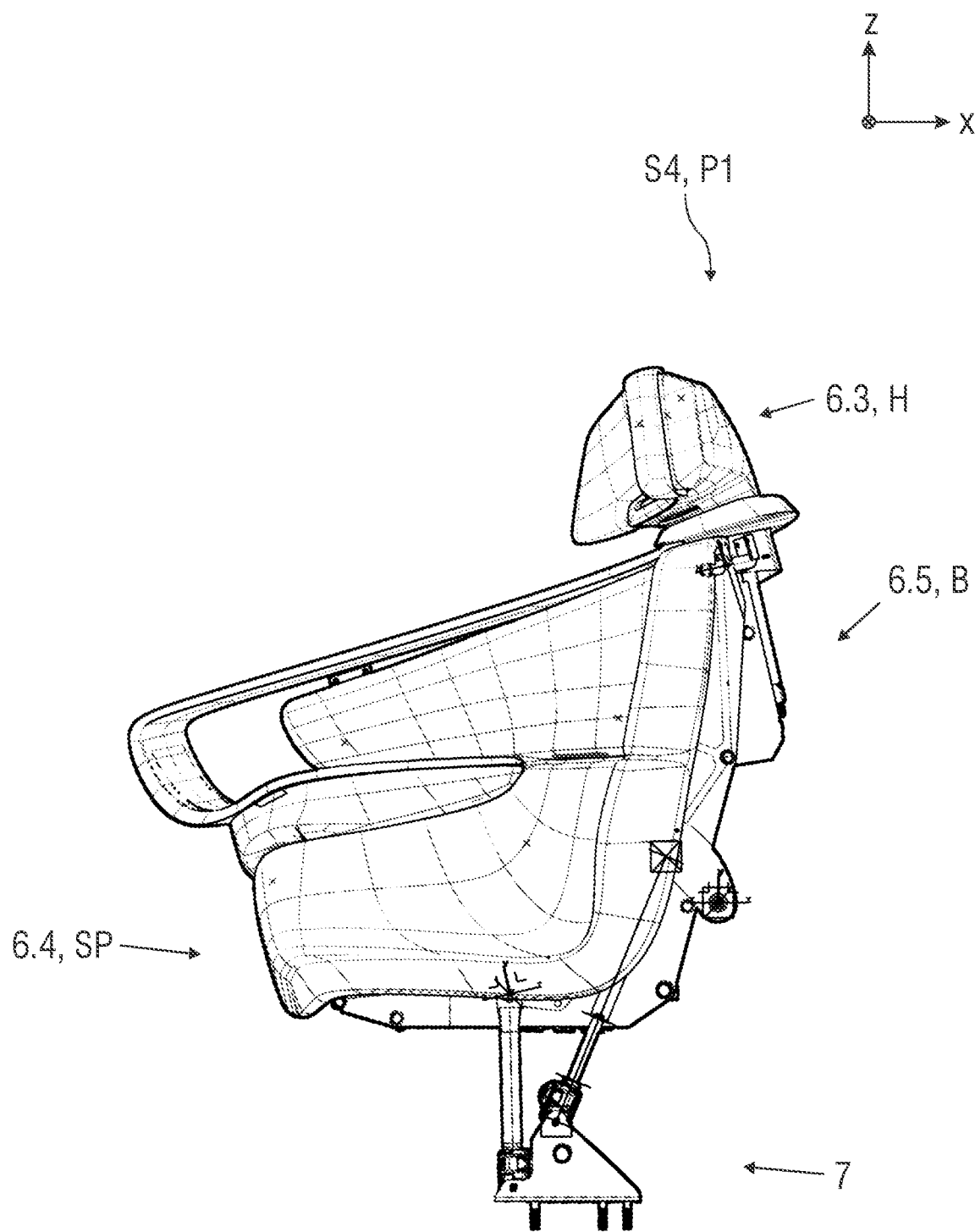
FIG. 6C shows a side view of an embodiment of a seat adjustment motion, in particular of the seat in a different position.
Figure 6D:
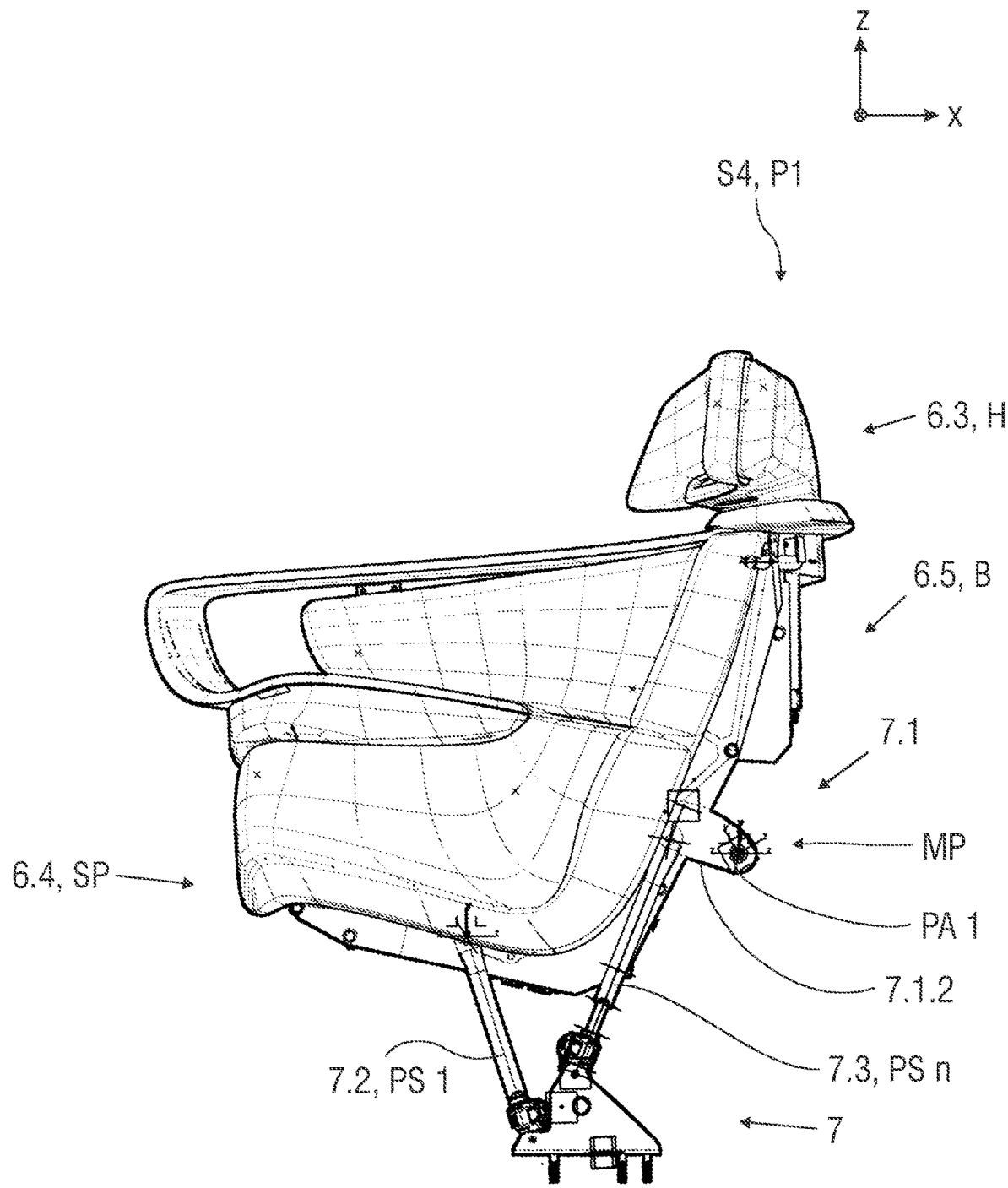
FIG. 6D shows a side view of an embodiment of a seat adjustment motion, in particular of the seat in a different position.
Figure 6E:
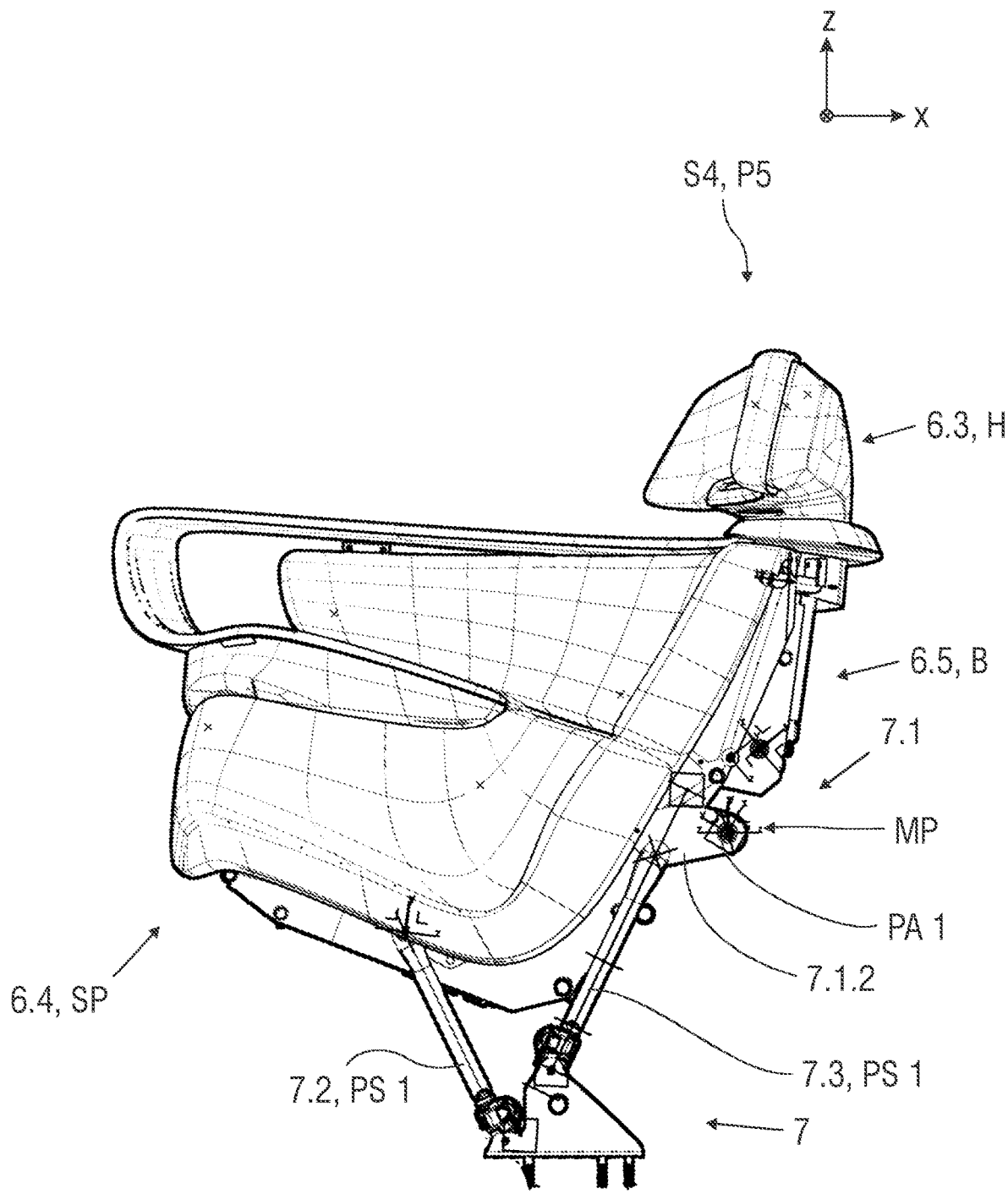
FIG. 6E shows a side view of an embodiment of a seat adjustment motion, in particular of the seat in a different position.

In particular, FIG. 6A shows the seat S4 in position P1, e.g. an initial, design, upright position P1, FIG. 6B shows the seat S4 in position P2, e.g. the tipped forward egress and ingress position P2, FIG. 6C shows the position P1 to which the seat S4 is adjusted back from the position P2 to be located such that the seat S4 can take the position P3, e.g. a recline comfort position P3 shown in FIG. 6D, wherein FIG. 6E shows the seat S4 in position P4, e.g. a deep recline relax and comfort position P4. In position P1, the linear actuators 7.2, 7.2' (7.2' not visible) are retracted and the linear actuator 7.3 is extended, wherein the coupling elements 7.1.2, 7.1.2' (7.1.2' not visible) is retained and directed upwards.

When the seat pan frame part 6.4 is tilted, e.g. tipped in a downward direction, the whole seat structure 6 is positioned in a forward, more inclined position P2. Hereby, the linear actuators 7.2, 7.2' are slightly tilted forward, e.g. due to a slight retraction of the linear actuator 7.3. To move the seat S4 to the comfort position P3, the linear actuator 7.3 is retracted until the linear actuators 7.2, 7.2' are tilted forward so that a front portion of the seat pan frame part 6.4 is raised in upward direction while the backrest frame part 6.5 is being pulled in a downward direction. Hereby, the coupling elements 7.1.2, 7.1.2' are being pulled in a downward direction with respect to the external pivot axis PA1. In a fully retracted position of the linear actuator 7.3, the seat S4 is positioned in the deep recline relax and comfort position P4, wherein the coupling elements 7.1.2, 7.1.2' are positioned in a downward directed end position.

What is claimed is:

1. A headrest adjusting device for headrest adjustment with respect to a backrest, the headrest adjusting device comprising:
   a headrest frame;
   a headrest mounting bracket carrying the headrest frame;
   a slide device movable mounted on the headrest mounting bracket; and
   a seat belt retainer which is coupled to the slide device; and
   a drive unit which is coupled to the slide device, wherein on actuation of the drive unit, the slide device is actuated to move along the headrest mounting bracket,
   wherein the seat belt retainer and the slide device do not extend beyond a profile defined by the headrest mounting bracket in a width direction with respect to the backrest and wherein the seat belt retainer and the slide device do not extend a profile of the headrest frame with respect to the width direction of the backrest.

2. The headrest adjusting device according to claim 1, wherein the seat belt retainer is movable along the headrest mounting bracket.

3. The headrest adjusting device according to claim 1, wherein the seat belt retainer is coupled to the slide device.

4. The headrest adjusting device according to claim 1, comprising a self-adjusting control device to adjust at least one of the slide device or the seat belt retainer to correct height for each individual user.

5. A seat structure for a vehicle seat, the seat structure comprising:
   a backrest frame part,
   a sub frame element defining a top surface of the backrest frame part,
   a headrest frame part and
   a headrest adjusting device which supports the headrest frame part on the sub frame element,
   wherein the headrest adjusting device comprising:
   a headrest mounting bracket fixed to at least one of the backrest frame part and the sub frame element, and
   a slide device movable mounted on the headrest mounting bracket, wherein the headrest mounting bracket comprises a seat belt retainer movable mounted on the headrest mounting bracket, wherein the seat belt retainer extends between the sub frame element and the headrest frame part, wherein the seat belt retainer does not extend a profile of the sub frame element and the headrest frame part in a width direction.

6. The seat structure according to claim 5, wherein the seat belt retainer is movable along the headrest mounting bracket.

7. The seat structure according to claim 5, wherein the seat belt retainer is coupled to the slide device.

8. The seat structure according to claim 5, wherein the seat belt retainer is individually movable from the slide device.

9. The seat structure according to claim 5, comprising a drive unit which is coupled to the slide device, wherein on actuation of the drive unit, the slide device is actuated to move along the headrest mounting bracket.

10. The seat structure according to claim 5, wherein headrest frame part is formed from a one-piece frame element.

11. The seat structure according to claim 5, wherein the seat belt retainer is arranged to guide a seat belt between an upper surface of the backrest and a lower surface of the headrest cushion.

12. The seat structure according to claim 11, wherein the seat belt is guided by the seat belt retainer so the belt is vertically bounded between the upper surface of the backrest and the lower surface of the headrest cushion.

13. The seat structure according to claim 5, wherein the seat belt retainer is vertically bounded between the sub frame element and the headrest frame part.

14. A seat for a vehicle, the seat comprising:
   a seat structure having at least a backrest frame part,
   a sub frame element defining a top surface of the backrest frame part,
   a headrest frame part and
   a headrest adjusting device which supports the headrest frame part on the sub frame element,
   wherein the headrest adjusting device comprising:
   a headrest mounting bracket fixed to at least one of the backrest frame part and the sub frame element, and
   a slide device movable mounted on the headrest mounting bracket, wherein the headrest mounting bracket comprises a seat belt retainer movable mounted on the headrest mounting bracket, wherein the seat belt retainer extends between the sub frame element and the headrest frame part, wherein the seat belt retainer does not extend a profile of the sub frame element and the headrest frame part in a width direction.

15. The seat according to claim 14, wherein the seat belt retainer is movable along the headrest mounting bracket.

16. The seat according to claim 14, wherein the seat belt retainer is coupled to the slide device.

17. The seat according to claim 14, wherein the seat belt retainer is individually movable from the slide device.

* * * * *